United States Patent [19]
Klinger

[11] Patent Number: 4,763,151
[45] Date of Patent: Aug. 9, 1988

[54] UNIVERSAL TRIPOD HEAD

[76] Inventor: Joseph K. Klinger, 3402-I West MacArthur Blvd., Santa Ana, Calif. 92704

[21] Appl. No.: 50,093

[22] Filed: May 14, 1987

[51] Int. Cl.$^4$ .......................................... G03B 17/00
[52] U.S. Cl. ..................................... 354/293; 352/243; 248/179
[58] Field of Search ................. 354/81, 293; 248/177, 248/178, 179, 183, 185, 187; 352/243

[56] References Cited

U.S. PATENT DOCUMENTS

| | | | |
|---|---|---|---|
| 1,186,992 | 6/1916 | Jargstorf . | |
| 1,735,149 | 11/1929 | Werner . | |
| 1,854,951 | 4/1932 | Neuwirth . | |
| 1,870,766 | 8/1932 | Beistle . | |
| 2,143,606 | 1/1939 | Mooney | 248/183 |
| 2,226,827 | 12/1940 | Moore | 248/183 |
| 2,237,281 | 4/1941 | Diesbach | 248/183 |
| 2,261,426 | 11/1941 | Willcox | 248/183 |
| 2,318,633 | 5/1943 | Ries | 248/183 |
| 2,323,473 | 7/1943 | Korling | 248/183 |
| 2,374,021 | 4/1945 | Korling | 248/171 |
| 2,424,499 | 7/1947 | Pasturczak | 248/183 |
| 2,434,829 | 1/1948 | Bentzman | 248/183 |
| 2,461,175 | 2/1949 | Peterson | 248/183 |
| 2,469,063 | 5/1949 | Bliss | 248/183 |
| 2,500,048 | 3/1950 | Stoiber | 248/177 |
| 2,506,440 | 5/1950 | Carlson | 81/41 |
| 2,524,172 | 10/1950 | Miller, Jr. et al. | 248/179 |
| 2,524,473 | 10/1950 | Pasturczak | 248/183 |
| 2,550,415 | 4/1951 | Kammermeyer | 248/183 |
| 2,556,598 | 6/1951 | Rasine | 248/179 |
| 2,567,068 | 9/1951 | Halmer | 248/177 |
| 2,618,452 | 11/1952 | Imhof | 248/279 |
| 2,684,822 | 7/1954 | Odin | 248/179 |
| 2,755,053 | 7/1956 | Sloane | 248/179 |
| 2,776,102 | 1/1957 | Schlafly | 248/178 |
| 2,802,633 | 8/1957 | Moore | 248/179 |
| 2,896,901 | 7/1959 | Levy et al. | 248/278 |
| 2,898,068 | 8/1959 | Warren | 248/183 |
| 2,962,251 | 11/1960 | Karpf | 248/183 |
| 3,006,052 | 10/1961 | Stickney et al. | 248/187 |
| 3,128,982 | 4/1964 | Christopher | 248/183 |
| 3,163,387 | 12/1964 | Thomas | 248/183 |
| 3,211,406 | 10/1965 | Averett | 248/183 |
| 3,353,776 | 11/1967 | Clemens | 248/183 |
| 3,661,376 | 5/1972 | Hill et al. | 269/75 |
| 4,247,069 | 1/1981 | Kurz | 248/185 |
| 4,249,817 | 2/1981 | Blau | 354/293 |
| 4,341,452 | 7/1982 | Korling | 354/293 |

FOREIGN PATENT DOCUMENTS 486833  9/1952  Canada .

*Primary Examiner*—L. T. Hix
*Assistant Examiner*—Brian W. Brown
*Attorney, Agent, or Firm*—Loyal M. Hanson; Gordon L. Peterson

[57] ABSTRACT

A tripod head includes a base member adapted to be mounted on a separate tripod for pivotal movement about a panning axis and a platform member on which to mount a separate camera. Components are provided for mounting the platform member on the base member to enable independent pivotal movement of the platform member about first and second mutually perpendicular tilting axes. A locking mechanism locks the platform member against pivotal movement about both of the tilting axes by operation of a single knob. Friction plates enhance locking, and the number and size of the friction plates may be adapted to cause locking about one tilting axis before the other. A quick release camera mount is included that enables convenient displacement ninety degrees.

13 Claims, 2 Drawing Sheets

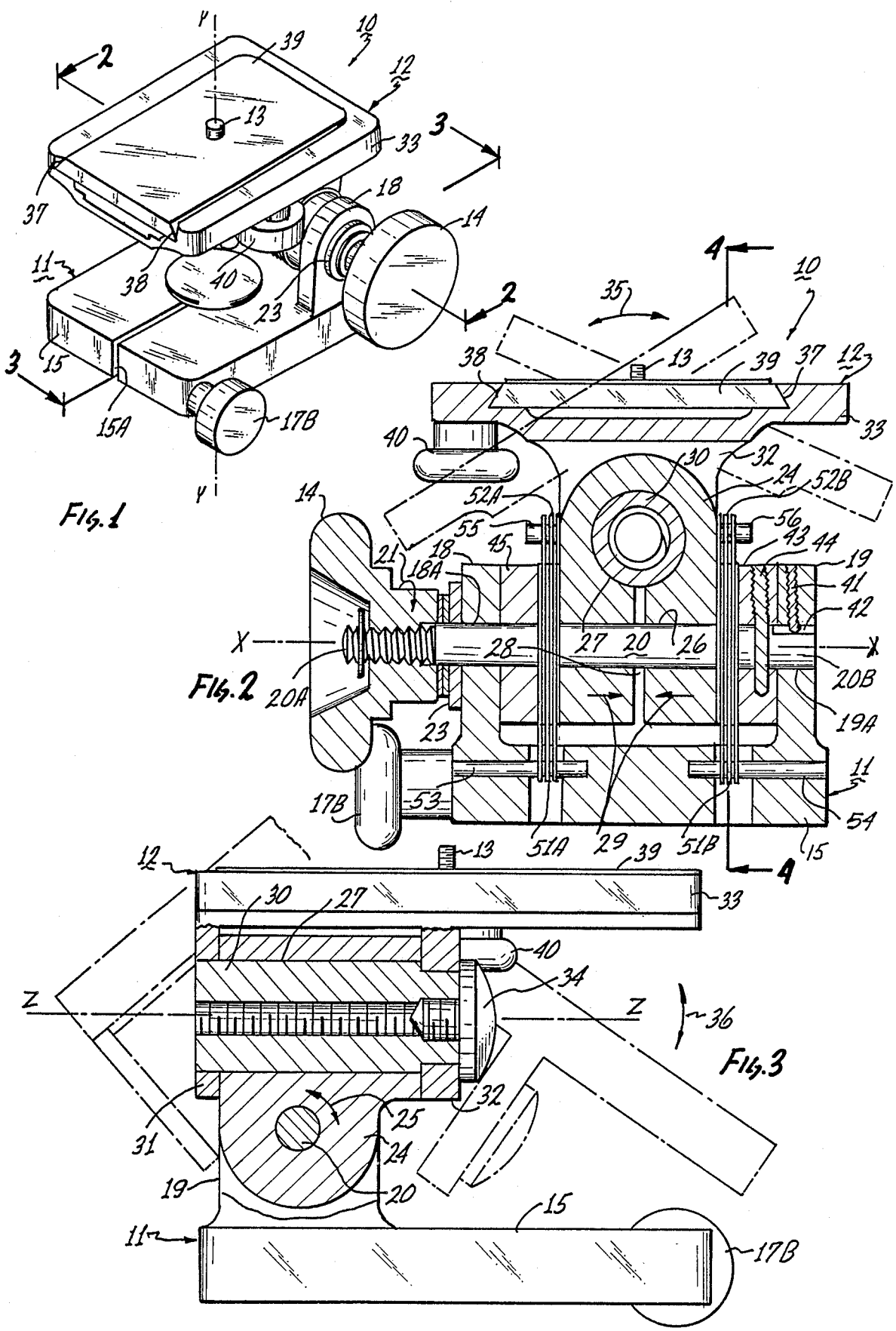

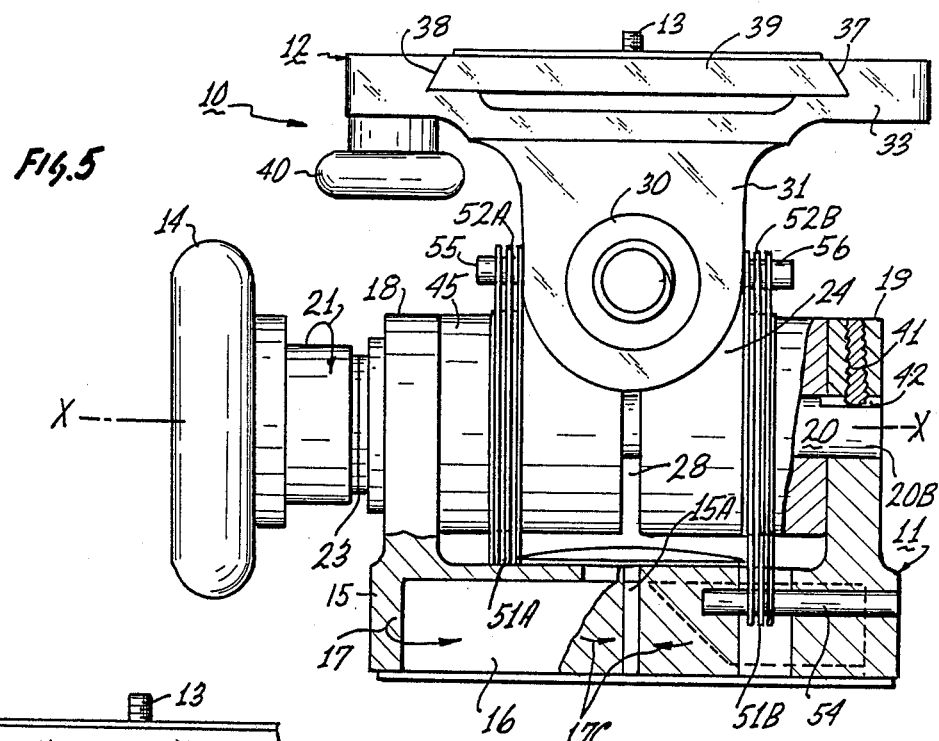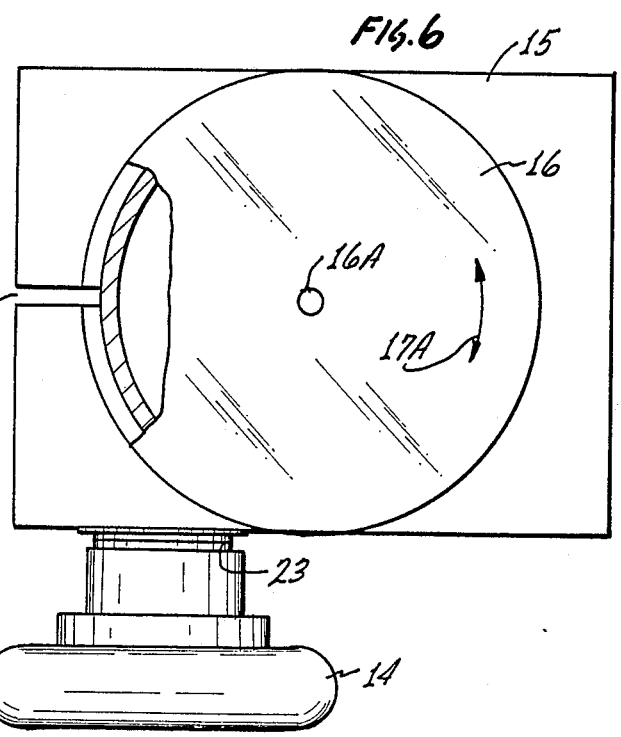

UNIVERSAL TRIPOD HEAD

CROSS REFERENCES TO RELATED APPLICATIONS

This application relates to copending U.S. patent application Ser. No. 050,094, filed herewith May 14, 1987, entitled "Adjustable Tripod Head."

BACKGROUND OF THE INVENTION

1. Technical Field

The invention relates generally to tripod heads for use in mounting a camera on a tripod, and more particularly to a new and improved tripod head featuring multiple axes locking with one knob.

2. Background Information

A tripod head mounts on a tripod, or other suitable support structure, as an adjustable mounting for a camera. The tripod provides stability while the tripod head enables adjustment of camera position for aiming purposes.

The tripod head usually includes a base that mounts on the tripod and a camera platform on which the camera mounts. Typically, the camera platform can be independently pivoted relative to the base about a selected one of two or three mutually perpendicular axes, and this enables flexibility in aiming the camera at a subject to be photographed.

The photographer first mounts the base of the tripod head on the tripod, and the camera on the camera platform. Then, loosening one or more locking mechanisms on the tripod head to free the camera platform, the photographer pivots the camera to a desired position relative to the subject being photographed and secures the camera platform in position.

Although convenient in many respects, this arrangement involves certain problems that need to be overcome. For example, in aiming the camera it may be desirable to free the camera platform so that the camera can be pivoted about more than one axis simultaneously. This is awkward to do with some existing tripod heads because they include a separate locking mechanism or locking knob for each axis. The photographer must loosen at least two knobs, adjust camera position, and then tighten the knobs while carefully retaining the camera in position.

This problem is overcome in some respects by existing tripod heads having a multiple axis locking arrangement. For example, U.S. Pat. No. 2,434,829 to Bentzman describes an adjustable tripod head with a camera platform or support bracket that can be moved about a vertical or panning axis as well as a horizontal or tilting axis. Twisting a handle simultaneously locks the support bracket against movement about both axes, and this simplifies adjustment in many respects.

However, the structure employed in the tripod head is somewhat complicated and bulky. In addition, combining tilting axis locking with panning axis locking dictates that the tilting axis be unlocked in order to pan a subject. Doing this may result in the camera tilting out of alignment. In addition, the support bracket can be tilted about only one horizontal axis, and this is not always sufficient for convenient camera alignment.

U.S. Pat. No. 2,802,633 to Moore describes another tripod head that enables panning about a vertical axis as well as tilting about two mutually perpendicular horizontal axes. A single finger knob locks all three axes, and while this three axes arrangement provides greater freedom of camera adjustment, the tilting axes must still be unlocked in order to pan.

Many of these concerns are overcome by the novel tripod head described in the copending application with a compact, multiple axes locking arrangement that includes one knob locking of two tilting axes apart from panning axis locking. However, some larger cameras may require a more secure locking mechanism than provided in the prior art. In addition, it is often desirable to adjust the camera about one tilting axis without upsetting camera alignment about the other tilting axis, and this is often inconvenient to do with a multiple axis locking mechanism. Furthermore, it is sometimes desirable to quickly reorientate the camera ninety degrees on the tripod head for camera aiming purposes, and this is somewhat inconvenient to do with existing tripod heads.

Consequently, it is desirable to have a new and improved tripod head with these added features. One not only having multiple tilting axes locking with one knob apart from panning axis locking, but also a more secure locking mechanism suitable for use with larger cameras that enables adjustment of one tilting axes without upsetting the other, as well as one that includes means for rapidly reorientating the camera on the tripod head.

SUMMARY OF THE INVENTION

This invention recognizes the problems associated with the prior art and provides a new and improved tripod head with the desired attributes.

Briefly, the above and further objects of the present invention are realized by providing a one knob locking mechanism for locking two tilting axes that includes interleaved friction plates for a first one of the two tilting axes. The friction plates provide more secure locking against pivotal movement to accommodate larger cameras, while locking the first tilting axis before the second tilting axis is locked so that final adjustment about the second tilting axis can be accomplished after the first tilting axis is locked. In addition, a quick change plate allows rapid reorientation of the camera on the tripod head.

Thus, the tripod head of this invention overcomes many concerns associated with the prior art. It has multiple tilting axes locking with one knob apart from panning axis locking. It includes a more secure locking mechanism suitable for use with larger cameras. The two step locking sequence enables final adjustment about the second tilting axis after the first is locked, and it includes means for rapidly reorientating the camera on the tripod head.

Generally, the tripod head includes a base member adapted to be mounted on a separate tripod for pivotal movement about a panning axis and a platform member on which to mount a separate camera. The base member may include a lower portion that can be screwed onto a conventional tripod, and the platform member may include a threaded shaft that mates with a threaded hole in a conventional camera.

The tripod head includes a combination of mounting components for mounting the platform member on the base member to enable independent pivotal movement of the platform member about each one of a pair of first and second mutually perpendicular tilting axes. In addition, the tripod head includes a locking mechanism for locking the platform member against pivotal movement about both of the tilting axes by operation of a single locking member without locking pivotal movement of the platform member about the panning axis.

According to one aspect of the invention, there is provided a plurality of friction plates for enhancing operation of the locking means in locking against pivotal movement about at least one of the first and second tilting axes. A first plurality of friction plates connected to the base member is interleaved with a second plurality of friction plates connected to the platform member. When the locking mechanism is operated, the first and second pluralities of friction plates press together, frictionally engage, and lock against pivotal movement about the first tilting axis.

According to another aspect of the invention, the number and size of the friction plates is adapted to cause locking against pivotal movement about the first tilting axis before causing locking against pivotal movement about the second tilting axis. Thus, locking proceeds in steps, allowing final adjustment of the about the last tilting axis to lock without upsetting adjustments about the other.

According to yet another aspect of the invention, there is provided a quick release camera mount that enables convenient displacement of the camera by ninety degrees on the platform member.

The above mentioned and other objects and features of this invention and the manner of attaining them will become apparent, and the invention itself will be best understood, by reference to the following description taken in conjunction with the accompanying illustrative drawings.

BRIEF DESCRIPTION OF THE DRAWINGS

FIG. 1 of the drawings is a perspective view of a tripod head constructed according to the invention;

FIG. 2 is an enlarged cross sectional view taken on line 2—2 of FIG. 1;

FIG. 3 is an enlarged cross sectional view taken on line 3—3 of FIG. 1;

FIG. 4 is a cross sectional view of a portion of the tripod head taken on line 4—4 of FIG. 2 showing further details of the friction plates;

FIG. 5 is an enlarged rear elevation view with portions broken away showing additional pivotal components; and FIG. 6 is an enlarged plan view taken of the bottom, with a portion broken away to shown panning axis pivotal components.

DESCRIPTION OF THE PREFERRED EMBODIMENTS

Referring now to the drawings, there is shown a new and improved tripod head 10 constructed in accordance with the present invention. Generally, the tripod head 10 includes a base member 11 that is adapted to be mounted on a separate tripod (not shown) for pivotal movement about a Y-axis or panning axis (FIG. 1). In addition to the base member 11, the tripod head includes a platform member 12 on which to mount a separate camera (not shown). The platform member 12 includes a threaded shaft 13 that mates with a threaded hole in a conventional camera for this purpose.

The platform member 12 is mounted on the base member 11 to enable independent pivotal movement of the platform member 12 about each one of a pair of first and second mutually perpendicular tilting axes. In the figures, an X-axis represents the first tilting axis (FIGS. 2 and 5) and a Z-axis represents the second tilting axis (FIGS. 3 and 4). With this arrangement, the platform member 12, and thus a camera mounted on the platform member 12, can be pivoted to a desired spatial orientation relative to a subject being photographed (not shown) in order to aim at and frame the subject.

As an idea of size, the base member 11 of the illustrated tripod head 10 is approximately seven to eight centimeters wide parallel to the X-axis and ten centimeters long parallel to the Z-axis. The tripod head 10 measures approximately eight centimeters high along the Y-axis, and it is fabricated according to known techniques, such as machining, from a suitable material, such as a metal alloy.

The tripod head 10 includes a single locking member or knob 14. When operated, the knob 14 cooperates with other components subsequently described to function as locking means for locking the platform member against movement about both of the tilting axes without locking pivotal movement of the platform member about the panning axis. Thus, the photographer can conveniently lock the tilting axes without locking the panning axis, or unlock the panning axis without upsetting camera tilt adjustments.

Considering now the base member 11 in further detail, it includes an upper member 15 on which the platform member 12 is mounted, and a lower member 16 (FIGS. 5 and 6) that is adapted to be mounted on the separate tripod. The lower member 16 may be a disc-shaped member with a threaded hole 16A (FIG. 6) enabling it to be screwed onto a threaded shaft on the separate tripod (not shown). Other known means for mounting the lower member 16 on the separate tripod, such as a clamp mechanism, may be employed according to the tripod to be used, but a threaded shaft on the tripod is common to many tripods.

The lower member 16 is pivotally mounted on the upper member 15 by suitable means such as an axle member on the lower member 16 that is rotatably journaled in the upper member 15 (not shown), and this enables pivotal movement of the upper member 15 relative to the lower member 16 about the panning axis as depicted by an arrow 17 in FIG. 5 and an arrow 17B in FIG. 6.

The base member 11 includes a panning axis locking mechanism 17B that operates apart from the knob 14 and associated components to function as panning axis securing means for locking against pivotal movement about the panning axis. The locking mechanism 17B accomplishes this with suitable known structure, such as a screwable member or knob that can be manually operated to compress a split in the upper member 15 and thereby lock the lower member 16 against pivotal movement about the panning axis.

The illustrated upper member 15 includes a split 15A for this purpose (FIGS. 1, 5 and 6), and the split 15A is compressed by operation of the locking mechanism 17B as depicted by the arrows 17C in FIG. 5. This results in the lower member 16 being bound or locked against pivotal movement about the panning axis.

The tripod head 10 includes platform mounting means for mounting the platform member 12 on the base member 11 to enable independent pivotal movement of the platform member 12 about each one of the first and second tilting axes. In addition, it includes locking means for locking the platform member 12 against pivotal movement about both of the tilting axes by operation of a single locking member. These functions are accomplished by the interaction of several components subsequently described.

A pair of first and second upstanding mounting members 18 and 19 are attached to the base member in spaced apart relationship (FIG. 2). They are integrally formed with the upper member 15 in the illustrated embodiment, although they may be otherwise attached according to known fabrication techniques. The first mounting member 18 defines a first bore 18A that extends through the mounting member 18 and the second mounting member 19 defines a second bore 19A that extends at least partially through the second mounting member 19. The bores 18A and 19A are in alignment with the first tilting axis.

A first shaft 20 extends along the first tilting axis between the mounting members 18 and 19. The first shaft 20 has a first end portion 20A extending through the first bore 18A and a second end portion 20B extending at least partially within the second bore 19A. The first shaft 20 fits within the bores 18A and 19A so that the first shaft 20 can be moved longitudinally relative to the mounting members 18 and 19 along the first tilting axis.

The first end portion 20A is partially threaded so that the knob 14 can be screwed onto the first end portion 20A and rotated in the direction of an arrow 21 in FIGS. 2 and 5 to draw the shaft 20 along the first tilting axis toward the knob 14. A lock nut 22 (FIG. 2) prevents removal of the knob 14, and a washer arrangement 23 provides a bearing surface for the knob 14.

A split coupling member 24 is mounted on the first shaft 20 between the mounting members 18 and 19. It is mounted for pivotal movement about the first shaft 20, and therefore the first tilting axis, as depicted by an arrow 25 in FIG. 3. The split coupling member 24 defines a bore 26 (FIG. 2) through which the first shaft 20 extends for this purpose. The first shaft 20 fits loosely enough within the bore 26 to enable pivotal movement of the split coupling member 24 without the first shaft 20 rotating.

The split coupling member 24 also defines a variable diameter through bore 27 aligned with the second tilting axis. The through bore 27 has a variable diameter in that it can be reduced in diameter by compressing a split 28 in the split coupling member 24 along the first tilting axis as depicted by the arrows 29 in FIG. 2. This enables a second shaft 30 extending through the variable diameter through bore 27 in alignment with the second tilting axis to be locked against pivotal movement about the second tilting axis.

A pair of first and second downwardly extending mounting ears 31 and 32 on the platform member 12 are mounted on the second shaft 30 for pivotal movement with the second shaft 30 about the second tilting axis. Preferably, the mounting ears 31 and 32 are integrally formed in one-piece construction with a platform member base 33 to be subsequently described in connection with the platform member 12. However, they may be separately fabricated and attached to the platform member base 33 by suitable means.

The second shaft 30 is secured to the mounting ear 32 by suitable means, such as a screw 34, and this secures the platform member base 33 to the second shaft 30 to enable pivotal movement of the platform member 12 with the second shaft 30 about the second tilting axis. Thus, the platform member 12 can be independently pivoted about the second tilting axis as depicted by an arrow 35 in FIG. 2 and about the first tilting axis as depicted by an arrow 36 in FIG. 3.

With the foregoing arrangement, the platform member 12 can be pivoted forty-five degrees in either of two opposite directions about the second tilting axis from the central position illustrated in FIG. 1, wherein the threaded shaft 13 is generally aligned with the panning axis. Intermediate tilted positions about the second tilting axis are shown in phantom lines in FIG. 2. Also, the platform member 12 can be pivoted from the central position ninety degrees in one direction and forty-five degrees in an opposite direction about the first tilting axis, intermediate tilted positions about the first tilting axis being shown in phantom lines in FIG. 3.

In one mode of operation, the camera is mounted on the platform member 12 with the platform member 12 in the central position so that the camera is directed along a path parallel to the second tilting axis. Camera aim is then adjusted in elevation by pivoting the platform member 12 about the first tilting axis. In a second mode of operation, the camera is mounted on the platform member 12 so that the camera is directed along a path parallel to the first tilting axis. Then, the platform member 12 is pivoted from the central position ninety degrees about the first tilting axis and elevation is adjusted by pivoting about the second tilting axis. Thus, the camera can be conveniently operated in two different orientations.

The platform member 12 includes a quick change feature for this purpose. The platform member base 33 defines a pair of spaced apart grooves 37 and 38 that face each other (FIGS. 1, 2, and 5). A plate 39 on which to mount the separate camera has a generally square shape adapted to be inserted into the grooves 37 and 38. The illustrated plate 39 is approximately six centimeters square and six millimeters thick for this purpose, and it can be conveniently slid into and out of the grooves to reorientate the camera to face along a selected one of the first and second tilting axes without adjusting camera mounting on the shaft 13.

A mechanism 40 (FIGS. 1, 2, 3, and 5) functions as quick release means for selectively securing the plate 39 in and releasing it from the grooves 37 and 38. It may employ suitable known structure, such as a rotatable knob that can be rotated from a released position, in which the plate 39 can be moved within the grooves 38 and 39, to a locked position in which the plate 39 is bound or locked within the grooves 38 and 39. In operation with a camera mounted on the plate 39 of the platform member 12, the mechanism 40 is rotated to the released position. Then, the plate 39 is slid out of the grooves 38 and 39, reorientated ninety degrees, and slid back into the grooves 38 and 39. Finally, the mechanism 40 is rotated back to the locked position and the platform member 12 is pivoted to aim the camera as desired by operation of the knob 14.

The knob 14 is used to lock against pivotal movement about the first and second tilting axis. As the knob 14 is rotated in the direction of the arrow 21 in FIGS. 2 and 5, the first shaft 20 is drawn toward the knob 14. A screw 41 in the mounting member 19 extends to within a groove 42 in the first shaft 20 to prevent rotation of the first shaft 20 when the knob 14 is rotated while allowing the first shaft 20 to move longitudinally along the first tilting axis toward the knob 14. Thus, this arrangement functions as key means for preventing rotation of the first shaft 20 about the first tilting axis when the knob 14 is operated.

A collar 43 mounted on and fixed to the first shaft 20 by a screw 44 (FIG. 5) cooperates with a spacer 45 mounted on the first shaft 20 to compress the split coupling member 24. The spacer 45 is mounted on the first shaft 20 so that the first shaft 20 can slide through the spacer 45 as the first shaft 20 is drawn toward the knob 14, and this results in compression of the split coupling member 24.

As a result of this action, the split coupling member 24 is frictionally engaged to lock against pivotal movement of the platform member 12 about the first tilting axis. Also, the variable diameter through bore 27 is reduced in diameter to frictionally engage the second shaft 30 to lock against pivotal movement of the platform member 12 about the second tilting axis. Thus, the knob 14 functions as a locking member threadably mounted on the first end portion 20A of the first shaft 20, with the first mounting member 18 between the knob 14 and the split coupling member 24, which knob 14 is adapted to be rotated to draw the first shaft 20 toward the knob 14 and the collar 43 toward the first mounting member 18 to thereby compress the split coupling member 24 along the first tilting axis and lock against pivotal movement about both the first and second tilting axes.

This locking arrangement is enhanced by a first plurality of friction plates 51A and 51B connected to the base member 11 adjacent to the split coupling member 24 and interleaved as illustrated in FIGS. 2 and 5 with a second plurality of friction plates 52A and 52B that are connected to the platform member 12. Preferably, the first plurality is connected directly to the base member 11 by a pair of pins 53 and 54, and indirectly to the platform member 12 by attachment with a pair of pins 55 and 56 to the split coupling member 24.

This fixes the first plurality of friction plates 51A and 51B against pivotal movement about the first tilting axis while causing the second plurality of friction plates 52A and 52B to pivot about the first tilting axis with the platform member 12. Thus, this arrangement functions as connection means for connecting the second plurality of friction plates 52A and 52B to the split coupling member 24 so that when the knob 14 is operated to compress the split coupling member 24, the first and second pluralities of friction plates are pressed together to frictionally engage and lock against pivotal movement about the first tilting axis.

Each one of the friction plates, composed of a suitable material such as a metal alloy, is mounted coaxially over the first shaft 20 in the positions illustrated, and each is approximately one-half millimeter thick. Interleaved in the manner illustrated, each one contacts one or two adjacent friction plates over a circular area approximately three centimeters in diameter. As the knob 14 is rotated, the friction plates 51A and 52A are pressed together between the spacer 45 and the split coupling member 24 while the friction plates 51B and 52B are pressed together between the collar 43 and the split coupling member 24. This results in increased frictional engagement that enhances locking against pivotal movement about at the first tilting axes to provide more secure locking. Of course, these dimensions may be varied within the inventive concepts disclosed.

Preferably, a total of twelve friction plates of the size described are utilized, although the number and size may be altered according to the operating characteristics desired. With the illustrated arrangement, operation of the knob 14 locks against pivotal movement about the first tilting axis sufficiently before locking against pivotal movement about the second tilting axis to enable the photographer to make final adjustments about the second tilting axis after the first tilting axis has been locked. Accordingly, the friction plates serve a multiple function, providing both more secure locking in addition to sequential locking about first one tilting axis and then the other.

Thus, the invention provides a new and improved tripod head that overcomes many concerns associated with the prior art. It has multiple tilting axes locking with one knob apart from panning axis locking. It includes a more secure locking mechanism suitable for use with larger cameras. The locking mechanism enables adjustment of one tilting axes without upsetting the other, and it includes means for rapidly reorientating the camera on the tripod head.

Although an exemplary embodiment of the invention has been shown and described, many changes, modifications, and substitutions may be made by one having ordinary skill in the art without necessarily departing from the spirit and scope of this invention. In this regard, the inventive concepts disclosed may be used for mounting a device other than a camera, and a separate support structure other than a tripod may be use. Thus, any such other devices are intended to fall within the scope of the word "camera" in the claims, and any such other separate support structures are intended to fall within the scope of the word "tripod" in the claims.

What is claimed is:

1. A tripod head, comprising:
    a base member adapted to be mounted on a separate tripod for pivotal movement about a panning axis;
    a platform member on which to mount a separate camera;
    platform mounting means for mounting the platform member on the base member to enable independent pivotal movement of the platform member about each one of a pair of first and second mutually perpendicular tilting axes, including
    locking means for locking the platform member against pivotal movement about both of the tilting axes by operation of a single locking member; and
    friction plate means for enhancing operation of the locking means in locking against pivotal movement about at least one of the first and second tilting axes;
    wherein the platform mounting means includes:
    a pair of first and second upstanding mounting members attached to the base member in spaced apart relationship, the first mounting member defining a first bore that extends through the mounting member in alignment with the first tilting axis and the second mounting member defining a second bore that extends at least partially through the second mounting member in alignment with the first tilting axis;
    a first shaft extending along the first tilting axis, the first shaft having a first end portion extending through the first bore and a second end portion extending at least partially within the second bore;
    a split coupling member mounted on the first shaft between the first and second mounting members for pivotal movement about the first tilting axis, which coupling member defines a variable diameter through bore aligned with the second tilting axis that can be reduced in diameter by compressing the split coupling member along the first tilting axis;

a second shaft extending along the second tilting axis through the variable diameter through bore; and a pair of first and second downwardly extending mounting ears on the platform member that are mounted on the second shaft for pivotal movement about the second tilting axis.

2. A tripod head as recited in claim 1, wherein the locking means includes:

a collar mounted in a fixed position on the second end portion of the first shaft between the split coupling member and the second mounting member;

a locking member threadably mounted on the first end portion of the first shaft with the first mounting member between the locking member and the split coupling member, which locking member is adapted to be rotated to draw the first shaft toward the locking member and the collar toward the first mounting member to thereby compress the split coupling member along the first tilting axis and lock against pivotal movement about both the first and second tilting axes.

3. A tripod head as recited in claim 2, wherein the friction plate means includes:

a first plurality of friction plates mounted on the first shaft adjacent the split coupling member, which first plurality of friction plates are fixed against pivotal movement about the first tilting axis;

a second plurality of friction plates mounted on the first shaft, which second plurality of friction plates are interleaved with the first plurality of friction plates; and connection means for connecting the second plurality of friction plates to the split coupling member so that when the locking member is operated to compress the split coupling member, the first and second pluralities of friction plates are pressed together to frictionally engage and lock against pivotal movement about the first tilting axis.

4. A tripod head as recited in claim 2, wherein: the number and size of the friction plates is adapted to cause locking against pivotal movement about the first tilting axis before causing locking against pivotal movement about the second tilting axis.

5. A tripod head as recited in claim 2, wherein the locking member includes:

a knob adapted to be screwed onto the first end portion of the first shaft.

6. A tripod head as recited in claim 2, further comprising:

key means, including a groove in the first shaft that engages a pin member extending radially into one of the first and second bores, for preventing rotation of the first shaft about the first tilting axis when the locking member is operated.

7. A tripod head as recited in claim 1, wherein the platform member includes:

a threaded shaft adapted to mate with a threaded hole in a conventional camera.

8. A tripod head, comprising:

a base member adapted to be mounted on a separate tripod for pivotal movement about a panning axis;

a platform member on which to mount a separate camera;

platform mounting means for mounting the platform member on the base member to enable independent pivotal movement of the platform member about each one of a pair of first and second mutually perpendicular tilting axes;

locking means for locking the platform member against pivotal movement about both of the tilting axes by operation of a single locking member; and friction plate means for enhancing operation of the locking means in locking against pivotal movement about at least one of the first and second tilting axes;

wherein the platform member includes:

a platform member base defining a pair of spaced apart grooves that face each other;

a plate on which to mount the separate camera, which plate has a generally square shape adapted to be inserted into the grooves for purposes of mounting the plate on the platform member base in either of two orientations that are displace ninety degrees from each other; and quick release means for selectively securing the plate in and releasing it from the grooves by operation of a single quick release mechanism.

9. A tripod head, comprising:

a base member adapted to be mounted on a separate tripod for pivotal movement about a panning axis;

a platform member on which to mount a separate camera;

platform mounting means for mounting the platform member on the base member to enable independent pivotal movement of the platform member about each one of a pair of first and second mutually perpendicular tilting axes;

locking means for locking the platform member against pivotal movement about both of the tilting axes by operation of a single locking member; and friction plate means for enhancing operation of the locking means in locking against pivotal movement about at least one of the first and second tilting axes;

wherein base member includes:

an upper member on which the platform member is mounted; a lower member adapted to be screwed onto the separate tripod, which lower member is pivotally mounted on the upper member to enable pivotal movement of the upper member relative to the lower member about the panning axis; and panning axis securing means apart from the locking means for locking against pivotal movement about the panning axis.

10. A tripod head as recited in claim 9, wherein the lower member includes:

a disc-shaped member adapted to be screwed onto a threaded shaft on a conventional tripod.

11. A tripod head, comprising:

a base member adapted to be mounted on a separate tripod for pivotal movement about a panning axis;

a platform member on which to mount a separate camera;

platform mounting means for mounting the platform member on the base member to enable independent pivotal movement of the platform member about each one of a pair of first and second mutually perpendicular tilting axes;

locking means for locking the platform member against pivotal movement about both of the tilting axes by operation of a single locking member; and friction plate means for enhancing operation of the locking means in locking against pivotal movement about at least one of the first and second tilting axes;

wherein:

the locking means is adapted to lock the platform member against pivotal movement about both of the tilting axes by operation of a single locking member without locking against pivotal movement of the platform member about the panning axis.

12. A tripod head, comprising:

a base member adapted to be mounted on a separate tripod for pivotal movement about a panning axis;

a platform member on which to mount a separate camera;

platform mounting means for mounting the platform member on the base member to enable independent pivotal movement of the platform member about each one of a pair of first and second mutually perpendicular tilting axes;

locking means for locking the platform member against pivotal movement about both of the tilting axes by operation of a single locking member without locking against pivotal movement of the platform member about the panning axis; and friction plate means for enhancing operation of the locking means in locking against pivotal movement about at least one of the first and second tilting axes, the friction plate means including a first plurality of friction plates connected to the base member and a second plurality of friction plates connected to the platform member, which second plurality of friction plates are interleaved with the first plurality of friction plates to cause the first and second pluralities of friction plates to press together, frictionally engage, and lock against pivotal movement about the first tilting axis when the locking means is operated.

13. A tripod head as recited in claim 12, wherein:

platform mounting means enables independent pivotal movement of the platform member about each one of two mutually perpendicular tilting axes;

the locking means locks against pivotal movement about both of the two tilting axes by operation of the locking member; and the number and size of the friction plates is adapted to cause locking against pivotal movement about one of the tilting axes before causing locking against pivotal movement about the other one of the two tilting axes.

* * * * *